United States Patent
Cahill et al.

(10) Patent No.: US 8,843,254 B2
(45) Date of Patent: Sep. 23, 2014

(54) SYSTEMS AND METHODS FOR DRAGGING BRAKE DETECTION

(75) Inventors: Eric D. Cahill, Troy, OH (US); Dale Prentice, Tipp City, OH (US)

(73) Assignee: Goodrich Corporation, Charlotte, NC (US)

(*) Notice: Subject to any disclaimer, the term of this patent is extended or adjusted under 35 U.S.C. 154(b) by 64 days.

(21) Appl. No.: 13/546,936

(22) Filed: Jul. 11, 2012

(65) Prior Publication Data

US 2014/0018978 A1 Jan. 16, 2014

(51) Int. Cl.
| | |
|---|---|
| *G06F 19/00* | (2011.01) |
| *G06G 7/70* | (2006.01) |
| *G05D 1/00* | (2006.01) |
| *B60B 39/00* | (2006.01) |
| *B60T 8/86* | (2006.01) |
| *B60T 8/17* | (2006.01) |
| *B60T 8/00* | (2006.01) |

(52) U.S. Cl.
CPC . *B60T 8/1703* (2013.01); *B60T 8/00* (2013.01)
USPC ...... 701/15; 701/3; 701/14; 701/71; 303/125; 303/126; 303/20

(58) Field of Classification Search
CPC ......... B60T 8/1703; B60T 8/00; B60T 8/325; B64C 25/426; B64C 25/44
USPC ............. 701/3, 14, 15, 71; 340/960; 303/125, 303/126, 20; 188/1.11 E
See application file for complete search history.

(56) References Cited

U.S. PATENT DOCUMENTS

| | | | | |
|---|---|---|---|---|
| 5,918,951 | A * | 7/1999 | Rudd, III | 303/150 |
| 6,123,292 | A * | 9/2000 | Ralph | 244/50 |
| 6,125,318 | A * | 9/2000 | Zierolf | 701/71 |
| 6,250,430 | B1 * | 6/2001 | Kyrtsos | 188/1.11 L |
| 6,604,708 | B1 * | 8/2003 | DeVlieg | 244/111 |
| 7,165,820 | B2 * | 1/2007 | Rudd, III | 303/167 |
| 2004/0011596 | A1 * | 1/2004 | Miller et al. | 188/1.11 W |
| 2005/0216160 | A1 * | 9/2005 | Zumberge et al. | 701/70 |
| 2006/0191751 | A1 * | 8/2006 | Miller et al. | 188/1.11 L |
| 2006/0226698 | A1 * | 10/2006 | Riebe et al. | 303/20 |
| 2007/0007088 | A1 * | 1/2007 | Miller et al. | 188/1.11 L |
| 2007/0236211 | A1 * | 10/2007 | Cahill | 324/173 |
| 2008/0137062 | A1 * | 6/2008 | Holton et al. | 356/28 |
| 2009/0114488 | A1 * | 5/2009 | Bailey et al. | 188/1.11 E |
| 2010/0188203 | A1 * | 7/2010 | Wallace et al. | 340/454 |

OTHER PUBLICATIONS

Webber, Brian; Preventing Wheel/Brake-area fires; Aero Quarterly; QTR_02 1 07; pp. 22-25: available online @ http://www.boeing.com/commercial/aeromagazine/articles/qtr_2_07/AERO_Q207_article4.pdf: last accessed Nov. 8, 2013.*

* cited by examiner

*Primary Examiner* — Behrang Badii
*Assistant Examiner* — Daniel L Greene
(74) *Attorney, Agent, or Firm* — Snell & Wilmer L.L.P.

(57) ABSTRACT

Systems and methods are disclosed for detection of dragging brakes for use in, for example, an aircraft. A method is provided comprising calculating, by a brake controller, a slip ratio based upon an aircraft speed and a speed of an aircraft wheel, determining, by the brake controller, that the slip ratio is above a threshold value, and sending, by the brake controller and in response to the slip ratio being above the threshold value, a dragging brake signal to an aircraft component.

18 Claims, 5 Drawing Sheets

SYSTEMS AND METHODS FOR DRAGGING BRAKE DETECTION

FIELD

The present disclosure is related to systems and methods for detecting a dragging brake for use in, for example, an aircraft.

BACKGROUND

Aircraft often include one or more landing gear that comprise one or more wheels. Each wheel may have a brake that is operatively coupled to the wheel to slow the wheel, and hence the aircraft during, for example, landing or a rejected take off. Aircraft brakes are not typically engaged voluntarily during take off, as brake engagement would act to impede forward motion of the aircraft. However, in the event of brake malfunction, one or more brakes may be at least partially engaged during a take off. Such engagement may not be enough to affect the ability of the aircraft to take off, and indeed, may be undetectable to the aircraft pilot and crew. In other cases, a dragging brake may prevent an aircraft from achieving takeoff speed. A pilot may elect to reject the take off in response to a dragging brake. A concern is that partial engagement of an aircraft brake during take off tends to generate heat in the brake, as the brake absorbs energy from the rotation of the wheel and thus increases in temperature.

A brake that is at least partially engaged at a time when no braking is commanded may be referred to as a "dragging" brake. If a brake drags during take off, it is not desirable to retract the wheel into the wheel well after take off due to the excess temperature of the brake. Retraction of a hot brake may pose a fire hazard and/or the tire may become too hot and fail. Thus, there is a need to detect a dragging brake at various times, such as during takeoff.

SUMMARY

Systems and methods disclosed herein may be useful for detecting a dragging brake. In this regard, a method is provided comprising calculating, by a brake controller, a slip ratio based upon an aircraft speed and a speed of an aircraft wheel, determining, by the brake controller, that the slip ratio is above a threshold value, and sending, by the brake controller and in response to the slip ratio being above the threshold value, a dragging brake signal to an aircraft component.

In various embodiments, a system is provided comprising, a brake controller in communication with an aircraft wheel speed sensor, the aircraft wheel speed sensor in communication with an aircraft wheel, wherein the brake controller calculates a slip ratio based upon an aircraft speed and a speed of the aircraft wheel, determines that the slip ratio is above a threshold value, and sends, in response to the slip ratio being above the threshold value, a dragging brake signal to an aircraft component.

In various embodiments, an article of manufacture is provided comprising a computer readable storage medium bearing instructions for dragging brake detection, the instructions, when executed by a brake controller, cause the brake controller to perform operations comprising calculating, by the brake controller, a slip ratio based upon an aircraft speed and a speed of an aircraft wheel, determining, by the brake controller, that the slip ratio is above a threshold value, and sending, by the brake controller and in response to the slip ratio being above the threshold value, a dragging brake signal to an aircraft component.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for detecting a dragging brake. Aircraft may comprise one or more types of aircraft wheel and brake assemblies. For example, an aircraft wheel and brake assembly may comprise a non-rotatable wheel support, a wheel mounted to the wheel support for rotation, and a brake disk stack. The brake stack may have front and rear axial ends. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk pack and a brake head may be located at the front end. The brake head may house one or more actuator rams that extend to compress the brake disk stack against the back plate, or the brake disk stack may be compressed by other means. Torque is taken out by the stator disks through a static torque tube or the like.

The actuator rams may be electrically operated actuator rams or hydraulically operated actuator rams, although some brakes may use pneumatically operated actuator rams. In brake systems that employ fluid powered (hydraulic or pneumatic power) actuator rams, the actuator ram may be coupled to a power source via a brake servo valve ("BSV") and a shutoff valve ("SOV"). The SOV effectively functions as a shutoff valve, wherein in a first position. (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, antiskid logic) controls the amount of fluid pressure provided to the actuator ram, and thus, the braking force applied to the wheel. To prevent or minimize unintentional braking (e.g., due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram, and thus, braking cannot be effected.

In electronic brakes, a brake controller is coupled to one or more electromechanical actuator controllers ("EMAC") for a brake, which drives one or more electromechanical brake actuators. The brake controller may be in communication with a brake pedal, and thus may control the EMAC in accordance with pilot/copilot braking commands. In various aircraft, other means are used to compress a brake disk stack. A brake controller may comprise a processor and a tangible, non-transitory memory. The brake controller may comprise one or more logic modules that implement brake logic. In various embodiments, the brake controller may comprise other electrical devices to implement brake logic.

Aircraft wheels often comprise a wheel base and a side rim. The wheel base is typically coupled to the aircraft brake for applying torque to cause the aircraft to decelerate. The side rim is typically coupled about a circumference of the wheel base and is often at least partially in contact with a tire. The side rim is typically held in position by the force exerted by a tire, and may transfer torque to the wheel base via, for example, a lock ring.

Figure 1:
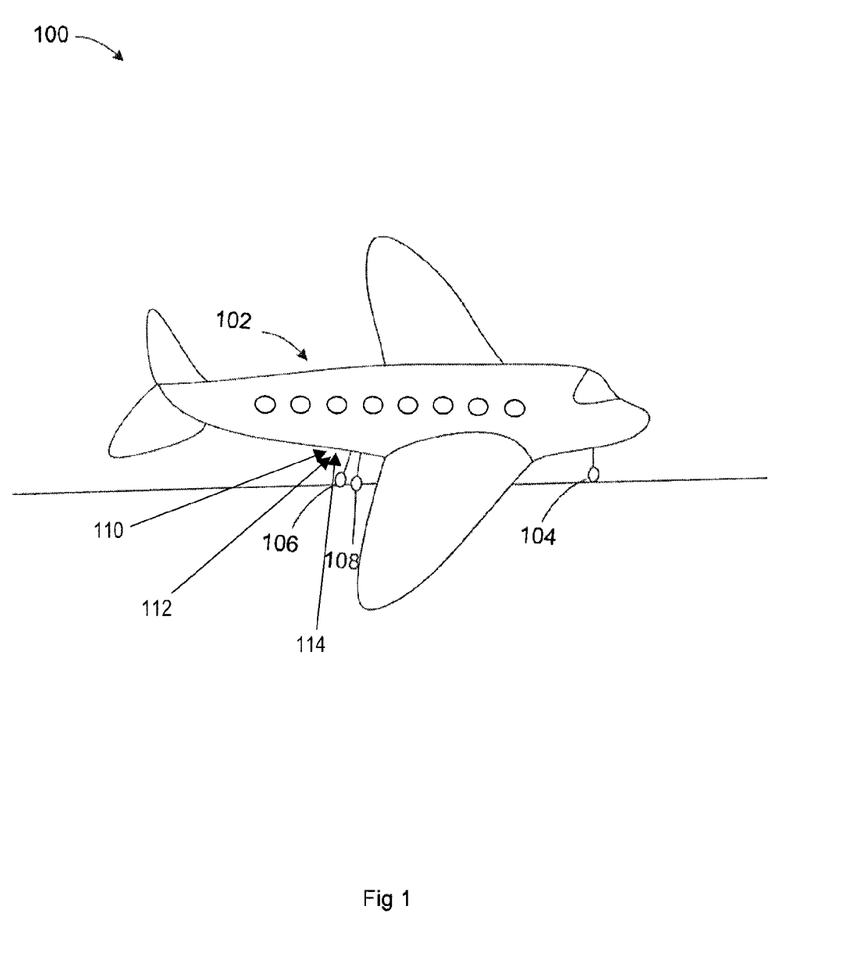
FIG. 1 illustrates an aircraft in accordance with various embodiments.

With reference to FIG. 1, aircraft 102 on runway 100 is shown. Aircraft 102 may comprise right landing gear 108 and left landing gear 106. Nose landing gear 104 is located under the nose of aircraft 102 and may not include a brake. Aircraft 102 may comprise brake controller 110, pilot notification system 112 and antiskid module 114.

Figure 2:
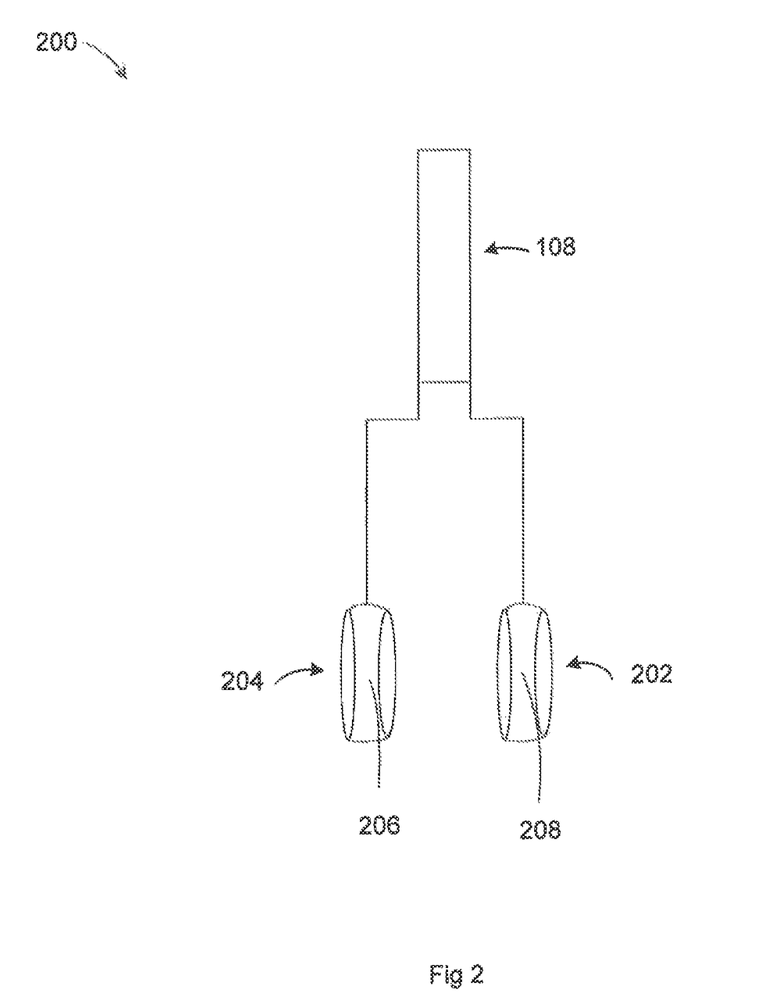
FIG. 2 illustrates a landing gear of the aircraft shown in FIG. 1, in accordance with various embodiments.

With reference to FIG. 2, landing gear assembly 200 is shown. Landing gear assembly 200 comprises right landing gear 108. Right landing gear 108 comprises right outboard wheel 202 and right inboard wheel 204. Right outboard wheel 202 comprises right outboard brake 208 and right inboard wheel 206 comprises right in board brake 206. The configuration of aircraft on runway 100 and landing gear assembly 200 is used for example only as aircraft may comprise multiple landing gear and/or multiple wheels and brakes. For example, a landing gear may comprise from about one to four wheels. Typically, each wheel may be operatively coupled to one brake to effect braking.

Figure 3:
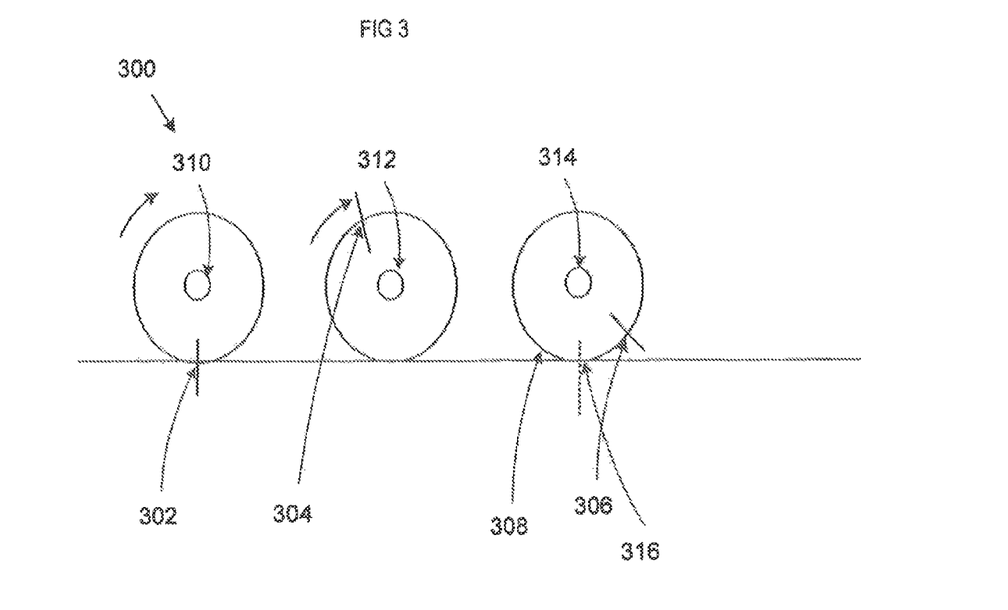
FIG. 3 illustrates a wheel and tire at rest and a wheel and tire undergoing braking in accordance with various embodiments.

With reference to FIG. 3, wheel and tire assembly 300 is shown. In theory, the velocity of axle 310 and 312 ($v_a$) is equal to the linear velocity of tire 302 and 304 ($v_t$), i.e., $v_a = v_t$. If axle 310 and 312 traveled 10 m in one second, then axle 310 and 312 is moving at $v_t = 10$ m/s. Tire 302 and 304 has a rolling radius of $r = 0.5$ m and thus has a tire circumference of $2\pi r$ m or $\pi$ m (~3.14 m). Tire 302 and 304 rotates (10 m×1 rev./10/π m), π revolutions (rev), or π rev/s. Accordingly, the speed of the runway surface relative to the tire, $v_r$, is π rev/s×10/π m/1 rev, which equals 10 m/s. In this theoretical example, the velocity of tire 302 and 304 and the velocity of axle 310 and 312 are equal, $v_a = v_t$.

However, in practice, a tire tends to slip. Thus, for example, one may assume that during braking axle 314 travels 10 m, but tire 308 only rotates a distance of 9.5 m. In this example, the velocity of axle 314 is 10 m/s and the velocity of tire 308's linear speed is only 9.5 m/s. The 0.5 m is represented as the distance from point 306 to point 316. The percent slip is 100×(10 m/s−9.5 m/s)/9.5 m/s=5.26% slip.

Slip ratio may be thought of as:

$$\text{slip\_ratio} = \left[\frac{V_{AIC} - V_{Wheel}}{V_{Wheel}}\right]$$

$$\%\_\text{slip\_ratio} = \left[\frac{V_{AIC} - V_{Wheel}}{V_{Wheel}}\right] \times 100$$

where $V_{AIC}$ is aircraft speed, $V_{wheel}$ is wheel speed. The percentage of slip ratio, as shown above, is slip ratio multiplied by 100.

In an aircraft with zero acceleration, $V_{AIC} = V_{wheel}$ such as shown in, for example, FIG. 3 where wheel point 302 and tire point 304 are shown to be coradial. Thus, slip ratio is relatively low (i.e., nearly 0).

$V_{AIC}$ may be determined in accordance with a variety of methods. The velocity of one or more wheels of an aircraft, and often all wheels of an aircraft, may be measured and filtered to exclude potentially erroneous data (e.g., a failed sensor, etc). The velocities of each wheel may then be averaged to derive the aircraft speed. The brake controller may calculate aircraft speed in such a manner. Even using filtering, in embodiments where aircraft speed is derived from the speed of multiple wheels, which themselves may be experiencing a dragging brake, there may be an inaccuracy in the aircraft speed value. $V_{AIC}$ may also be determined using other types of aircraft speed sensors that may be present in an aircraft or in communication with an aircraft.

Inaccuracies are inherent in all or nearly all measuring devices. Thus, inaccuracies are preferably handled or otherwise accounted for in various embodiments. If an inaccuracy associated with a given slip ratio calculation is too large, it may not be relied upon. For example, inaccuracies in aircraft speed and wheel speed tend to decrease as wheel speed or aircraft increase. For example, inaccuracy may decrease when the aircraft speed exceeds 10 knots, further decrease when the aircraft speed exceeds 50 knots, and may decrease further still when the aircraft speed exceeds 80 knots. To detect a dragging brake during take off, the detection may take place at a speed where inaccuracy is low enough to be useful, but the timeliness of detecting a dragging brake decreases as aircraft speed increases.

Inaccuracy may also be illustrated mathematically via inclusion into the slip ratio calculation. For example:

$$SR_\% \pm \Delta_{SR}\% - SR_\% =$$

$$100 \times \left[\left(\frac{V_{AIC} \pm \Delta_{AIC} - V_{Wheel} \pm \Delta_{Wheel}}{(V_{Wheel} \pm \Delta_{Wheel})}\right)\right] - \left[\frac{V_{AIC} - V_{Wheel}}{V_{Wheel}}\right]$$

Where $SR_\%$ is slip ratio percentage, $\Delta_{SR\%}$ is the inaccuracy of the slip ratio percentage, $\Delta_{Wheel}$ is the inaccuracy of the wheel speed and $\Delta_{AIC}$ is the inaccuracy of the aircraft speed. Solving for $\Delta_{SR\%}$ yields:

$$\pm \Delta_{SR}\% = 100 \times \left[\left(\frac{V_{Wheel}(V_{AIC} \pm \Delta_{AIC}) - V_{AIC}(V_{Wheel} \pm \Delta_{Wheel})}{V_{Wheel}(V_{Wheel} \pm \Delta_{Wheel})}\right)\right]$$

One may assume that the random errors associated with the aircraft speed determination are small compared to the individual wheel speed errors. Thus, we may arrive at:

$$\pm \Delta_{SR}\% = 100 \times \frac{V_{A/C}}{V_{Wheel}} \left[ \left( \frac{(\pm \Delta_{Wheel})}{(V_{Wheel} \pm \Delta_{Wheel})} \right) \right]$$

Given that wheel speed errors may be an order of magnitude smaller than wheel speed measurement at most speeds above, for example, 50 knots, and that an observed slip ratio may range from about 0% to about 30% it may be found that:

$$\pm \Delta_{SR}\% \cong 100 \times \frac{V_{A/C}}{V_{Wheel}} \frac{1}{V_{Wheel}} = 100 \times \frac{V_{A/C}}{V_{Wheel}^2}$$

Through observation, it may be found that typically, without a dragging brake, a slip ratio may be less than 2% at speeds above about 50 knots. Thus, the below may be derived:

$$\pm \Delta_{SR}\% = 93.8 * V_{wheel}^{-0.985}$$

A slip ratio beyond a given threshold value may indicate a dragging brake. While the selection of a threshold value may be based upon aircraft size, weight, engine power, brake size, and other suitable factors, in various embodiments a threshold value may range from about 0.5% to 15%, more preferably from about 1% to about 10% and more preferably from about 1.5% to about 4%. The threshold value may be compared to the slip ratio of a particular wheel on an aircraft, though in various embodiments the threshold value may be compared to an average slip ratio of one or more of the wheels of an aircraft. For example, the threshold value may be compared to the average of the left outboard and left inboard wheel or the average of all aircraft wheels.

In various embodiments, the threshold value may be set at a slip ratio that is a predetermined amount above an "ambient" slip ratio. Stated another way, tires in motion tend to slip to some degree without braking. Thus, a rotating wheel may have an "ambient" slip ratio that is not the result of a brake application. For example, such a slip ratio may be 1%. The threshold value may be set to 3%, or 2% greater than the ambient ratio. Such "ambient" slip ratio may be calculated and adjusted over time, whether automatically or in response to changes in aircraft tires, wheels, brakes, or other components.

In various embodiments, two threshold values may be used. A first threshold value may be used against the slip ratio of one wheel or a subset of wheels and the second threshold value may be used against the average slip ratio of more than one wheel. In various embodiments, a threshold value may be compared against the difference between the wheel having the greatest slip ratio and the average slip ratio across one or more wheels.

Calculated slip ratios for one or more wheels may thus be processed to further determine whether a dragging brake is present. A slip ratio that is negative, such as a slip ratio having the opposite sign of braking, may be set to zero to improve calculations.

An aircraft may take an action in response to a slip ratio that is beyond a given threshold value. A brake controller may send a signal indicative of a dragging brake to another aircraft component. For example, a brake controller may send a dragging brake signal to a cockpit component. A cockpit component may be any system that delivers information to the cockpit. For example, a cockpit component may cause a light, icon, graphic, or other visual or audio representation to appear in the cockpit to indicate a dragging brake. The aircraft pilot or other crew member may then take remedial action based upon the dragging brake signal. For example, a pilot may delay landing gear retraction until it is believed that the dragging brake has cooled.

A dragging brake converts the kinetic energy of an aircraft wheel to heat energy which, in turn, raises the temperature of the brake. This relationship may be shown as:

$$T°_{Brake} \propto \text{Brake\_Energy} = \int r \cdot \theta \approx \Sigma \tau \cdot \theta$$

Accordingly, the temperature of the brake will increase over time in relation to the torque applies and the radians traveled (i.e., the rotations of the wheel). Depending upon brake construction, friction material, ambient temperature, and other factors, the brake controller or other component may calculate an estimate temperature of a dragging brake. This calculated temperature may then be used to calculate the time needed to cool to brake to a temperature suitable for retraction into the wheel well. In various embodiments, a fixed period of time may be determined to delay landing gear retraction, such as a period of time that would allow even relatively hot brakes to cool. For example, such times may be between from about 5 minutes to about 20 minutes.

Figure 4:
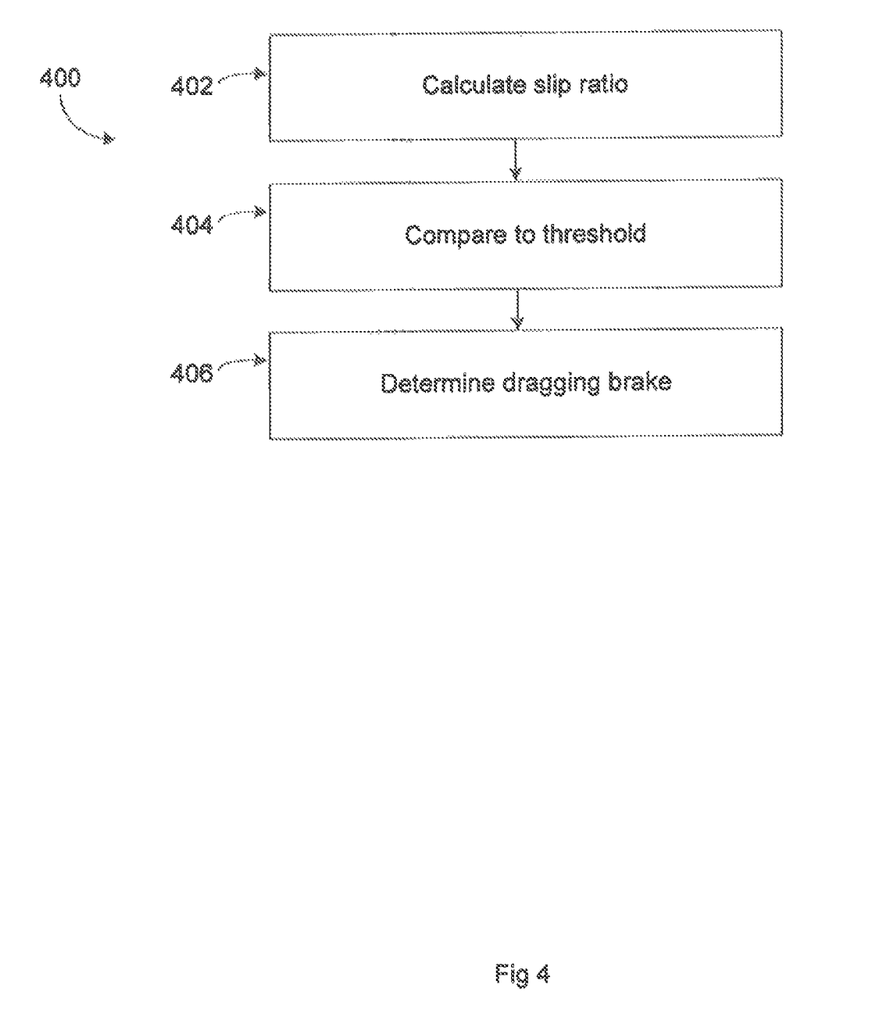
FIG. 4 illustrates a slip ratio method, in accordance with various embodiments.

With reference to FIG. 4, dragging brake detection 400 is shown. In step 402, slip ratio is calculated for an aircraft wheel. Slip ratio may be calculated in any suitable manner such as those disclosed herein. Moreover, slip ratio may be calculated in response to aircraft speed exceeding a given speed, such as 50 knots. Step 402 may also include a calculation of an inaccuracy associated with the slip ratio and, if such inaccuracy exceeds an inaccuracy threshold value, the process may conclude and not proceed to step 404.

Step 404 comprises comparing the slip ratio calculated in step 402 to a predetermined threshold value. The comparing may implemented by a simple comparator or by use of computer implemented logic.

Step 406 comprises determining a dragging brake. In this regard, if the slip ratio exceeds the threshold value, it may be determined that a dragging brake is present. In response to the determination, a dragging brake signal may be sent to another aircraft component. A pilot or other crew member may then use the dragging brake signal to delay landing gear retraction to allow the dragging brake additional time to cool. In various embodiments, a value is set to true or false in response to the determination of a dragging brake.

Figure 5:
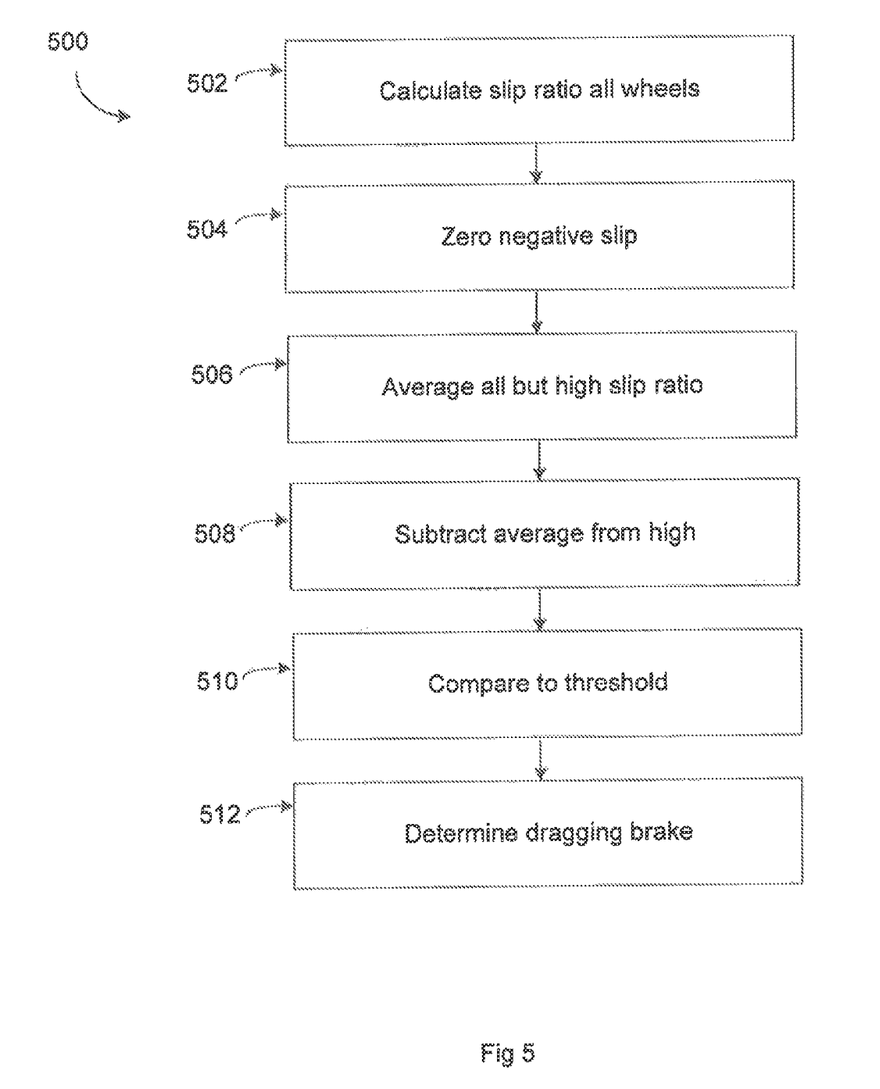
FIG. 5 illustrates a dragging brake detection method, in accordance with various embodiments.

With reference to FIG. 5, dragging brake detection 500 is shown. In step 502, slip ratio is calculated for each aircraft wheel of an aircraft that also has a brake associated with it. Slip ratio may be calculated in any suitable mariner such as those disclosed herein. Moreover, slip ratio may be calculated in response to aircraft speed exceeding a given speed, such as 50 knots. Step 502 may also include a calculation of an inaccuracy associated with the slip ratios and, if such inaccuracy exceeds an inaccuracy threshold value in connection with one or more slip ratios, the process may conclude and not proceed to step 504.

Step 504 comprises setting the negative slip ratios to zero. A slip ratio that is positive indicates braking. A slip ratio that is negative indicates either an error in measurement or a transient "gear walk" that cause velocity to be higher than the aircraft velocity. In step 504, such slip ratios are set to 0 for further processing.

Step 506 comprises averaging all slip ratios except the highest slip ratio. This determines the average slip ratio of the wheels, excluding the most outlying slip ratio.

Step 508 comprises subtracting the average found in step 506 from the highest slip ratio to yield a deviation from the slip ratio average.

Step 510 comprises comparing the deviation from the slip ratio average to a predetermined threshold value. In this regard, if the deviation from the slip ratio average exceeds the threshold value, it may be determined that a dragging brake is present. In response to the determination, a dragging brake signal may be send to another aircraft component. A pilot or other crew member may then use the dragging brake signal to delay landing gear retraction to allow the dragging brake additional time to cool. In various embodiments, a value is set to true or false in response to the determination of a dragging brake.

As an example of the process shown in FIG. 5, one may calculate the slip ratios of four wheels on an aircraft to find:
LHOB: 4.2%, LHIB=−2.2%, RHIB-1.1, RHOB=2.9%
where LHOB is a left hand outboard wheel, LHIB is a left hand inboard wheel, RHOB is a right hand outboard wheel, and RHIB is a right hand inboard wheel. The LHIB and RHIB values may be set to zero, as those values are negative. It is found that LHOB has the greatest slip ratio (4.2%). The average of the remaining wheels (LHIB, RHIB, and RHOB) is 2.9%+0+0=2.9/3=0.97%. The average may be subtracted from the greatest value, 4.2% such that 4.2%−2.9%=1.3%. If the threshold value for the deviation from the slip ratio average is 2%, then 2%>1.3%, and thus it may be determined that a dragging brake is not present.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment; or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
calculating, by a brake controller, a slip ratio based upon an aircraft speed and a speed of an aircraft wheel;
determining, by the brake controller, that the slip ratio is above a threshold value; and
sending, by the brake controller and in response to the slip ratio being above the threshold value, a dragging brake signal to an aircraft component,
wherein the calculating is in accordance with the equation $$\text{slip\_ratio} = \left[\frac{V_{AIC} - V_{Wheel}}{V_{Wheel}}\right].$$

2. The method of claim 1, wherein the aircraft component is a pilot notification system.

3. The method of claim 1, wherein the calculating is performed by an antiskid module of the brake controller.

4. The method of claim 1, wherein the aircraft speed is determined based upon a speed of a second aircraft wheel.

5. The method of claim 1, wherein the determining occurs in response to the aircraft speed exceeding 40 knots.

6. The method of claim 1, further comprising calculating an inaccuracy of the slip ratio.

7. The method of claim 6, further comprising determining whether the inaccuracy is above an inaccuracy threshold value.

8. The method of claim 1, further comprising calculating an amount of heat energy absorbed by a brake of the aircraft wheel.

9. The method of claim 8, further comprising alerting a cockpit component to indicate a need for brake temperature determination.

10. A system comprising:
a brake controller in communication with an aircraft wheel speed sensor; the aircraft wheel speed sensor in communication with an aircraft wheel;
wherein the brake controller:
calculates a slip ratio based upon an aircraft speed and a speed of the aircraft wheel;
determines that the slip ratio is above a threshold value; and
sends, in response to the slip ratio being above the threshold value, a dragging brake signal to an aircraft component,
wherein the calculating is in accordance with the equation $$\text{slip\_ratio} = \left[\frac{V_{AIC} - V_{Wheel}}{V_{Wheel}}\right].$$

11. A computer readable storage medium bearing instructions for dragging brake detection, the instructions, when executed by a brake controller, cause the brake controller to perform operations comprising:
calculating, by the brake controller, a slip ratio based upon an aircraft speed and a speed of an aircraft wheel;
determining, by the brake controller, that the slip ratio is above a threshold value; and sending, by the brake controller and in response to the slip ratio being above the threshold value, a dragging brake signal to an aircraft component,
wherein the calculating is in accordance with the equation $$\text{slip\_ratio} = \left[ \frac{V_{AIC} - V_{Wheel}}{V_{Wheel}} \right].$$

12. The computer readable storage medium of claim 11, wherein the aircraft component is a pilot notification system.

13. The computer readable storage medium of claim 11, wherein the calculating is performed by an antiskid module of the brake controller.

14. The computer readable storage medium of claim 11, wherein the aircraft speed is determined based upon a speed of a second aircraft wheel.

15. The computer readable storage medium of claim 11, wherein the determining occurs in response to the aircraft speed exceeding 50 knots.

16. The computer readable storage medium of claim 11, further comprising calculating an amount of heat energy absorbed by a brake of the aircraft wheel.

17. The computer readable storage medium of claim 11, further comprising calculating an inaccuracy of the slip ratio.

18. The computer readable storage medium of claim 17, further comprising determining whether the inaccuracy is above an inaccuracy threshold value.

* * * * *